US008783579B2

(12) United States Patent
Chang et al.

(10) Patent No.: US 8,783,579 B2
(45) Date of Patent: Jul. 22, 2014

(54) RFID SEALING DEVICE FOR BOTTLE

(75) Inventors: Li-Chi Chang, Taichung (TW); Yung-Chung Chang, Yunlin County (TW); Chang-Chih Liu, Taichung (TW); Cheng-Hua Tsai, New Taipei (TW); Meng-Sheng Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/541,754

(22) Filed: Jul. 4, 2012

(65) Prior Publication Data

US 2014/0008443 A1      Jan. 9, 2014

(51) Int. Cl.
*G06K 19/06* (2006.01)

(52) U.S. Cl.
USPC ............ 235/492; 235/385; 340/568; 343/873

(58) Field of Classification Search
USPC ........ 235/492, 385; 340/568, 572.1; 215/901; 343/873
See application file for complete search history.

(56) References Cited

U.S. PATENT DOCUMENTS

| | | | |
|---|---|---|---|
| 5,986,616 A | 11/1999 | Edvardsson | |
| 6,137,413 A * | 10/2000 | Ryan, Jr. | 340/572.8 |
| 6,373,436 B1 * | 4/2002 | Chen et al. | 343/702 |
| 7,017,807 B2 * | 3/2006 | Kipp et al. | 235/385 |
| 7,151,455 B2 | 12/2006 | Lindsay et al. | |
| 7,710,274 B2 | 5/2010 | Choi et al. | |
| 7,714,794 B2 | 5/2010 | Tavassoli Hozouri | |
| 7,876,221 B2 | 1/2011 | Tanaka et al. | |
| 2005/0275601 A1 * | 12/2005 | Jostell et al. | 343/895 |
| 2006/0038683 A1 * | 2/2006 | Claessens et al. | 340/572.1 |
| 2010/0065647 A1 * | 3/2010 | Ritamaki et al. | 235/492 |
| 2012/0228388 A1 * | 9/2012 | Kuo et al. | 235/492 |

FOREIGN PATENT DOCUMENTS

TW       I322961       4/2010

OTHER PUBLICATIONS

Deleruyelle et al., "An RFID Tag Antenna Tolerant to Mounting on Materials," IEEE Antennas and Propagation Magazine, vol. 52, No. 4, Aug. 2010, p. 14-p. 19.
Hu et al., "Bottle Packaged Wine Product Detection by UHF RFID Systems," Electromagnetics in Advanced Applications (ICEAA), 2010, p. 301-p. 304.
Zauind-Deen et al., "Curved Dual-Band Dielectric Resonator Tag Antenna for RFID Applications," 28th National Radio Science Conference (NRSC 2011), 2011, p. 1-p. 8.
Björninen et al., "Development of a Low Profile Conformal UHF RFID Tag Antenna for Identification of Water Bottles," IEEE Antennas and Propagation (APSURSI), 2011, p. 533-p. 536.
Deleruyelle et al., "RFID Tag Antennas with Stable Impedance to Mounted Material," Proceedings of the 40th European Microwave Conference, 2010, p. 1090-p. 1093.

* cited by examiner

*Primary Examiner* — Thien M Le
*Assistant Examiner* — Asifa Habib
(74) *Attorney, Agent, or Firm* — Finnegan, Henderson, Farabow, Garrett & Dunner, LLP

(57) ABSTRACT

An RFID sealing device for a bottle is disclosed, which provides information of production resumes, stock control, sale control and so like, where the information may be adapted for a computerized foods management system for the upstream manufacturer and the downstream sellers. Since the metal cap plays a part in the RFID sealing device, the RFID shall malfunction once the bottle cap has been turned or opened before sale, so that the present RFID sealing device plays a function of safety identifier to the bottled liquid or food in addition.

11 Claims, 10 Drawing Sheets

_US 8,783,579 B2_

RFID SEALING DEVICE FOR BOTTLE

TECHNICAL FIELD

The present disclosure relates to a sealing device for a bottle, and also relates to a radio frequency identification (RFID) sealing device for a bottle.

BACKGROUND

FIG. 1 is a schematic diagram of an antenna. Referring to FIG. 1, U.S. Pat. No. 7,714,794 depicts an antenna 10 that consists of two sections 12, 14. The first section 12 consists of the main radiating components, here shown as straight conductive traces 16, while the second section 14 consists of substantially reactive components, here shown as spiral conductive traces 18. In the characteristic manner of dipole-type antennas, the antenna 10 here has a left dipole half 20 mirrored by a right dipole half 22. The left dipole half 20 of the antenna 10 includes both a first section 12 and a second section 14, as does the right dipole half 22. Each first section 12 includes a feed point 24, for connecting the antenna 10 to a transponder chip 15.

SUMMARY

An RFID sealing device for a bottle is introduced herein. According to an exemplary embodiment of the disclosure, the RFID sealing device for a bottle includes a metal cap, a chip and a metal strip. The metal cap is configured on a top of a bottleneck of the bottle. The chip has a top electrode electrically coupled to the metal cap. Additionally, the metal strip is electrically coupled to a bottom electrode of the chip.

Several exemplary embodiments accompanied with figures are described in detail below to further describe the disclosure in details.

BRIEF DESCRIPTION OF DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
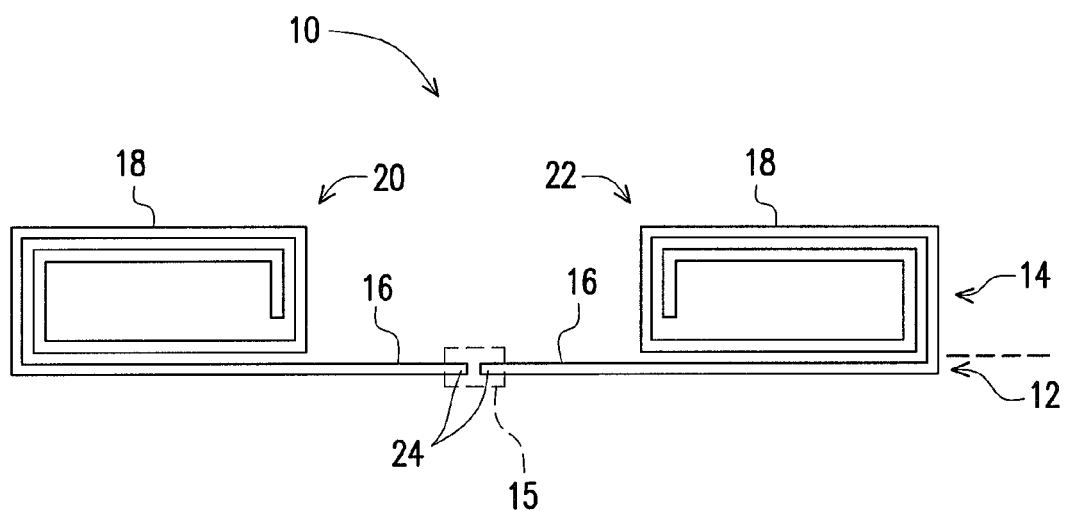
FIG. 1 is a schematic diagram of an RFID antenna.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

A radio-frequency integrated chip (RFIC) with a dipole antenna is disclosed in the disclosure. An RFIC in combination with a metal cap on top and a metal strip on bottom constitutes a RFID device for a bottle, where both the metal cap and the metal strip function as the dipole antenna for the RFIC. The metal cap is electrically coupled to a top electrode of the RFIC, and the metal strip is electrically coupled to a bottom electrode of the RFIC. The RFID may bear all the merchandise information like a traditional RFID tag. However, the present disclosure is not limited thereto. In addition, the RFID may function as a sealing device or a safety identifier to the bottled liquid or food. The RFID malfunctions if the metal cap has been turned before sold. The bottled liquid or food can be screened when passing through an RFID reader during sale so that any questioned bottled liquid or food can be prevented from outgoing to reach consumer.

An RFID antenna design is based on monopole antenna characteristic and extends to the asymmetrical design. Monopole antenna is consisted of metal strip or metal rod, radio frequency source, and a ground plane. The metal strip has a length of about a quarter wavelength of the operation frequency. By means of image theorem, a same phase of RF current is induced in the ground plane due to the quarter wavelength metal strip configured below. The RFID antenna design proposed in the present disclosure is a design equivalent to a half-wavelength dipole antenna.

In the present disclosure, the proposed RFID design is on the basis of the image theorem of monopole antenna. For downsizing and impedance matching, the helix metal strip is designed for the proposed types, see FIGS. 4, 7, and 9, that is approximately/substantially a quarter wavelength of the operation frequency. The phase of RF current of the metal cap is equal to that of the quarter wavelength metal strip. In general, the RF current path on the metal cap is over a quarter wavelength that may become a good ground plane for radiation.

Figure 2:
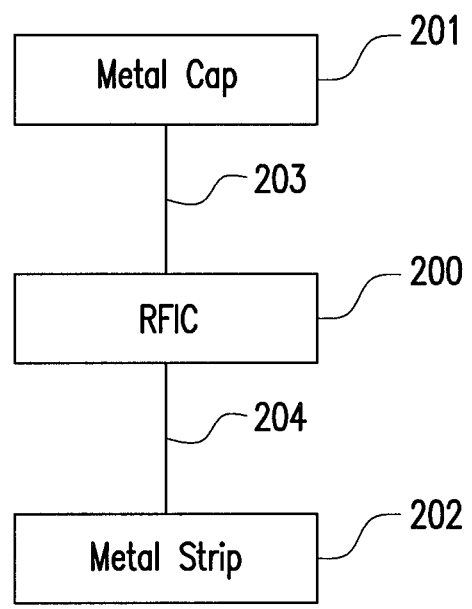
FIG. 2 is a schematic diagram illustrating an RFID sealing device for a bottle according to an embodiment.

FIG. 2 is a schematic diagram illustrating a basic concept of RFID sealing device for a bottle according to an exemplary embodiment of the present disclosure. Referring to FIG. 2, an RFIC 200 has a top electrode electrically coupled to a metal cap 201 which is mounted on a top of a bottle, and has a bottom electrode electrically coupled to a metal strip 202 which is pasted on the surface of the bottleneck. Either the connection 203 or the connection 204 can be damaged or broken once the metal cap 201 is turned to open the bottle; malfunction of the RFID device can then be caused so that questioned bottles can be screened out when passing through an RFID reader. The metal cap 201 and metal strip 202 are unsymmetrical in shape for the middle RFIC 200.

Figure 3:
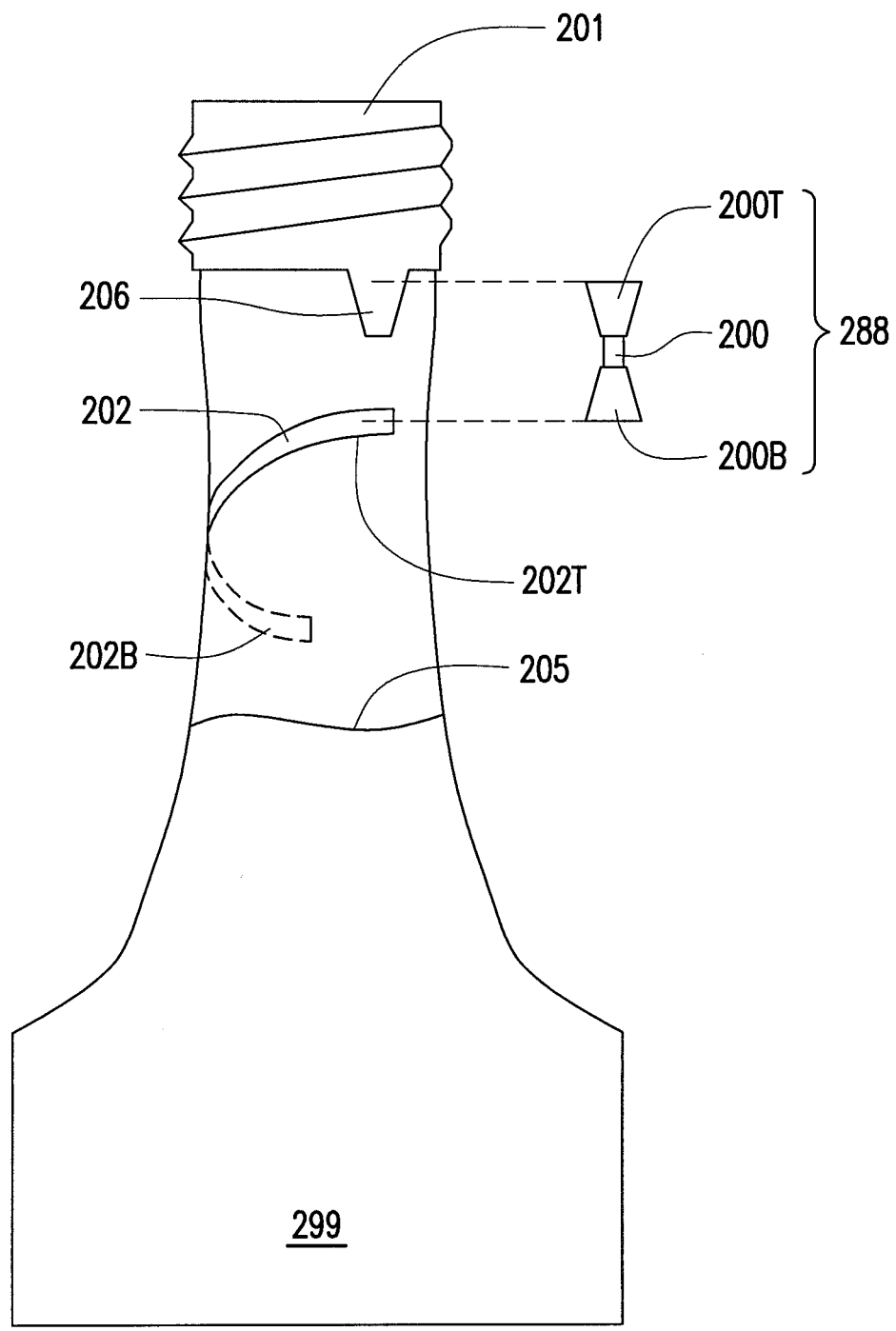
FIGS. 3~5 are schematic diagrams illustrating RFID sealing devices for a bottle according to a first embodiment.
Figure 4:
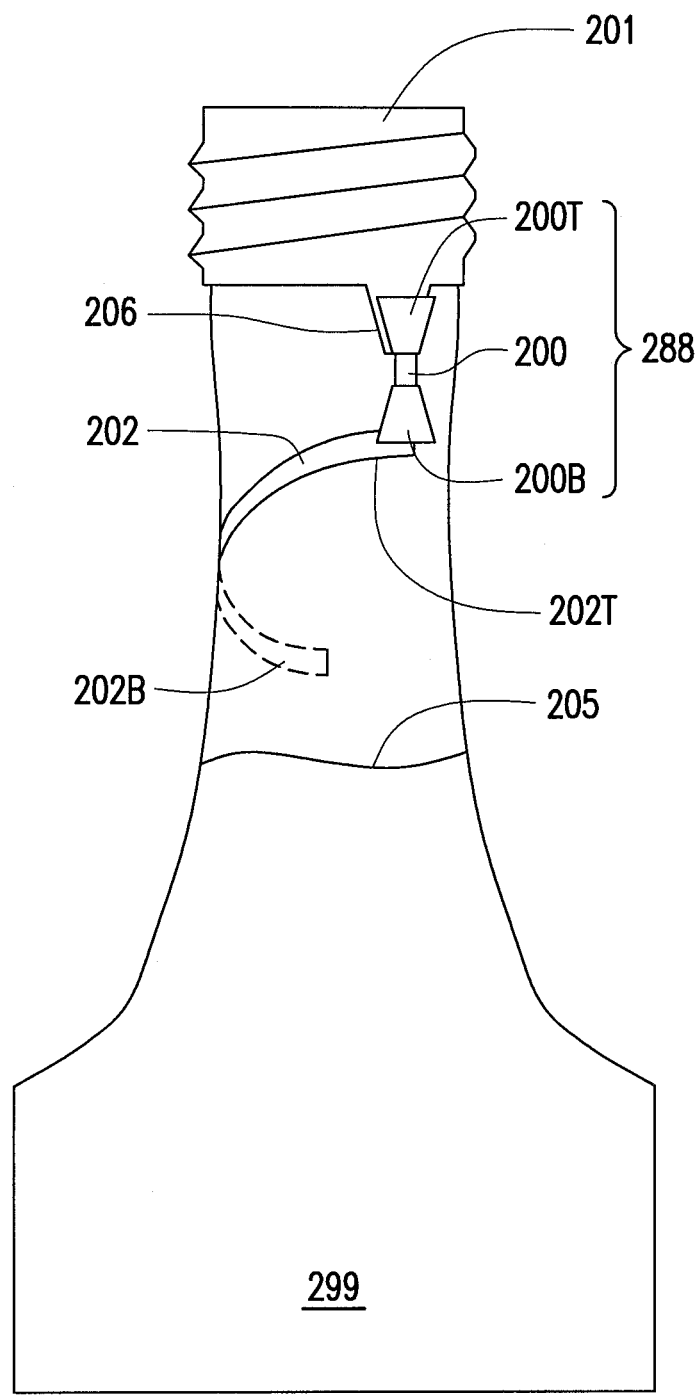
Figure 5:
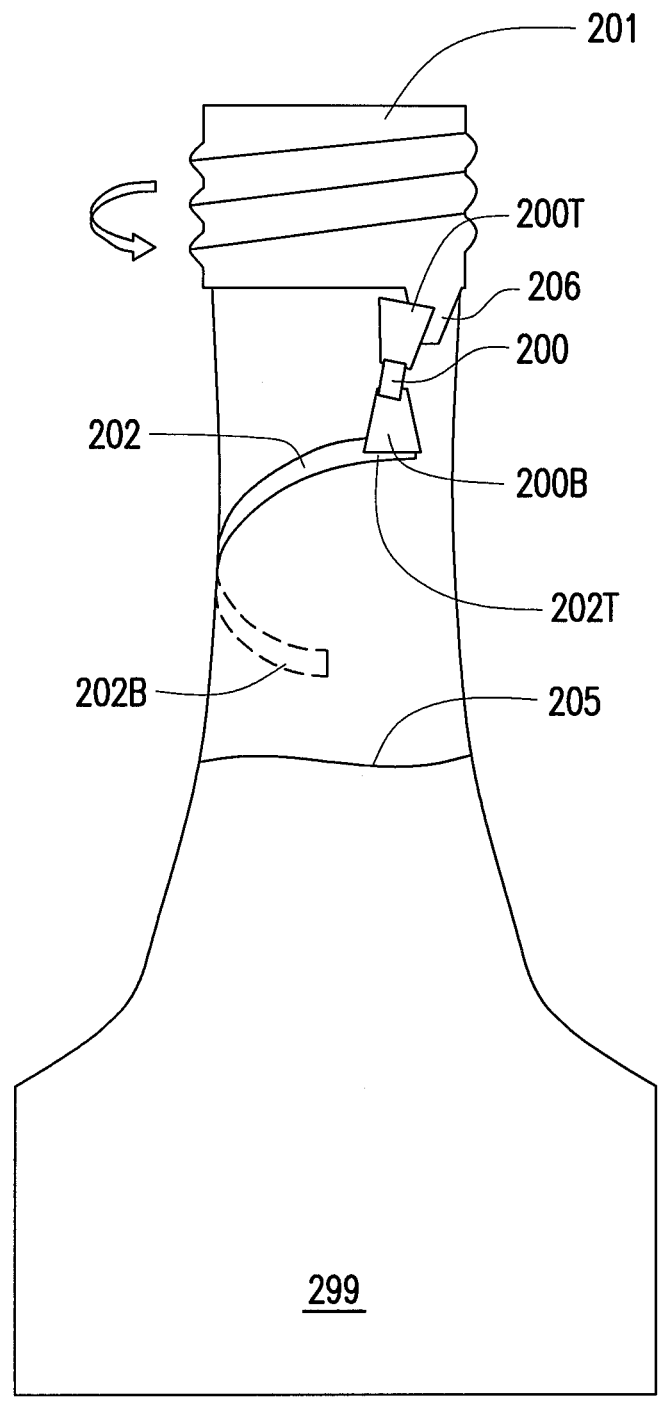

FIGS. 3-5 is a first embodiment of the present disclosure. FIG. 3 shows a bottle 299 having liquid inside, and the liquid has a liquid level surface 205. A threaded metal cap 201 mounts on the top of the bottleneck. A downward metal protrusion 206 is extended from a bottom fringe of the metal cap 201. An RFID strap 288 is prepared, where the RFID strap 288 has an RFIC 200 in the middle, a metal 200T on the top, and metal 200B on the bottom. The top metal 200T is electrically coupled to a top electrode (not shown) of the RFIC 200 and the bottom metal 200B is electrically coupled to a bottom electrode (not shown) of the RFIC 200. The top metal 200T is electrically coupled to the metal cap 201 through contacting the metal protrusion 206. A metal strip 202 is pasted onto the surface of the bottleneck of the bottle 299. A top end 202T of the metal strip 202 is electrically coupled to the bottom metal 200B. The metal strip 202 has a bottom end 202B which is configured above a liquid level surface 205 of the liquid contained in the bottle 299. The metal strip 202 is in a helix shape and is configured for winding around the bottleneck as an example only.

The first embodiment may have a constant slope configured to the metal strip and such constant slop embodiment may be realized by a metal cap 201 which has a 1.5 cm radius and 2.3 cm height mounted on a bottle 299. A metal strip 202 is 0.1 cm wide and 9 cm long, and the tilt angle θ between the metal strip 202 with reference to the horizontal line is 6 degree, a constant slope. The center frequency for the operation frequency is, for example, 910 MHz. An RFIC 200 is sandwiched, and electrically coupled to, in between the metal cap 201 and the metal strip 202. The effective communication distance is, for example, within three meters according to the first exemplary embodiment.

FIG. 4 shows a situation when the RFID strap is assembled according to the first exemplary embodiment. The RFID strap 288 is then firmly fixed to straddle onto the metal protrusion 206 and the top end 202T of the metal strip 202. The top metal 200T of the RFID strap 288 is electrically coupled to the metal protrusion 206; and the bottom metal 200B of the RFID strap 288 is electrically coupled to the top end 202T of the metal strip 202.

FIG. 5 shows a situation if the metal cap being turned according to the first exemplary embodiment. Once the metal cap 201 is turned to open the bottle, the weakest connection in the combination of the metal protrusion 206, top metal 200T, RFIC 200, bottom metal 200B, and the top end 202T of the metal strip 202 may be broken. FIG. 5 shows a broken occurred at the connection between the metal protrusion 206 and the top metal 200T as an example only.

Figure 6:
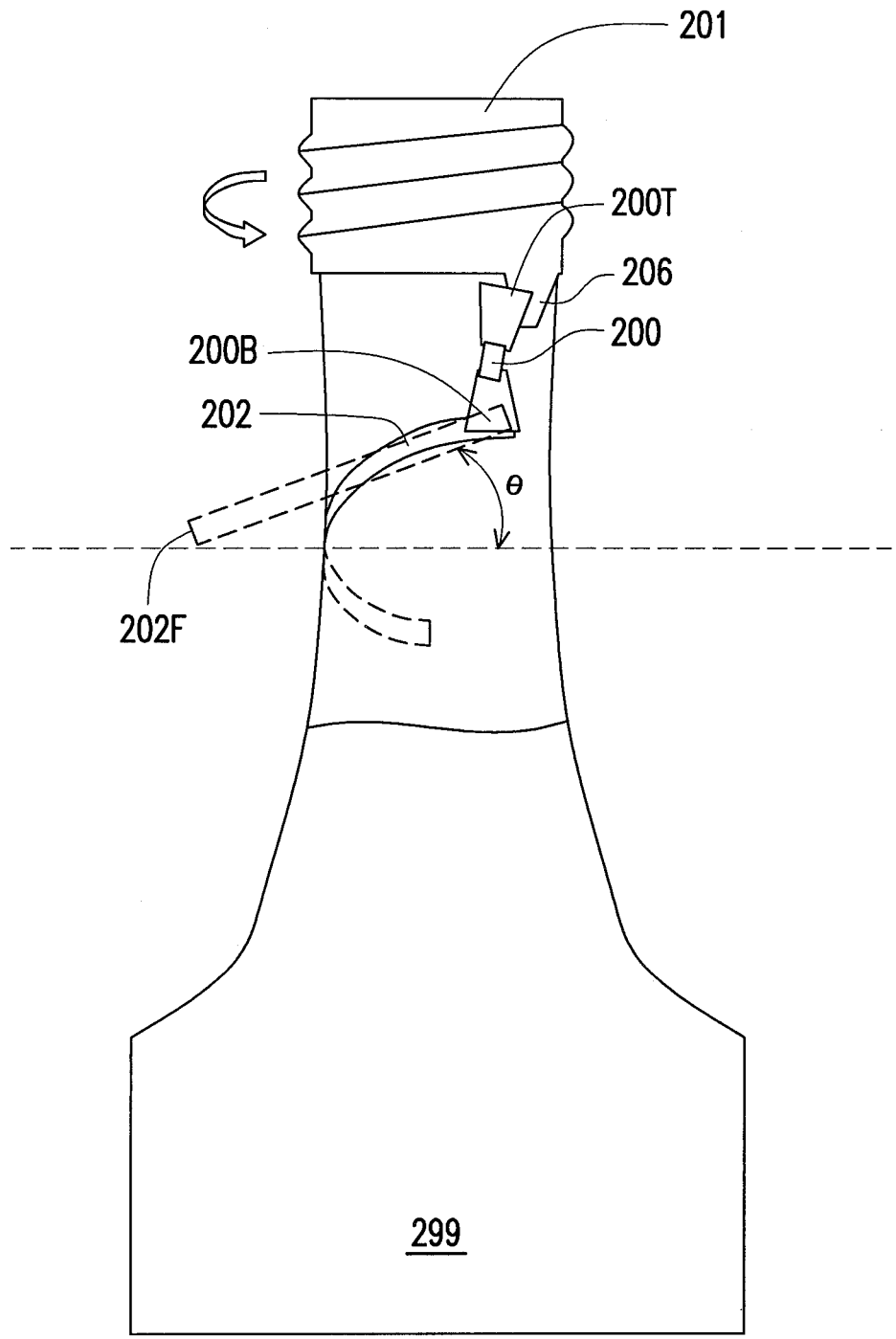
FIG. 6 shows a shape of the flattened metal strip.

FIG. 6 shows a shape of the flattened metal strip. FIG. 6 shows that the metal strip 202 is in a shape of a helix and may be configured for winding around the bottleneck with a constant slope top-down. The dashed rectangular metal strip 202F represents a flattened metal strip 202. The metal strip 202F has a zero slope difference along its longitudinal direction.

Figure 7:
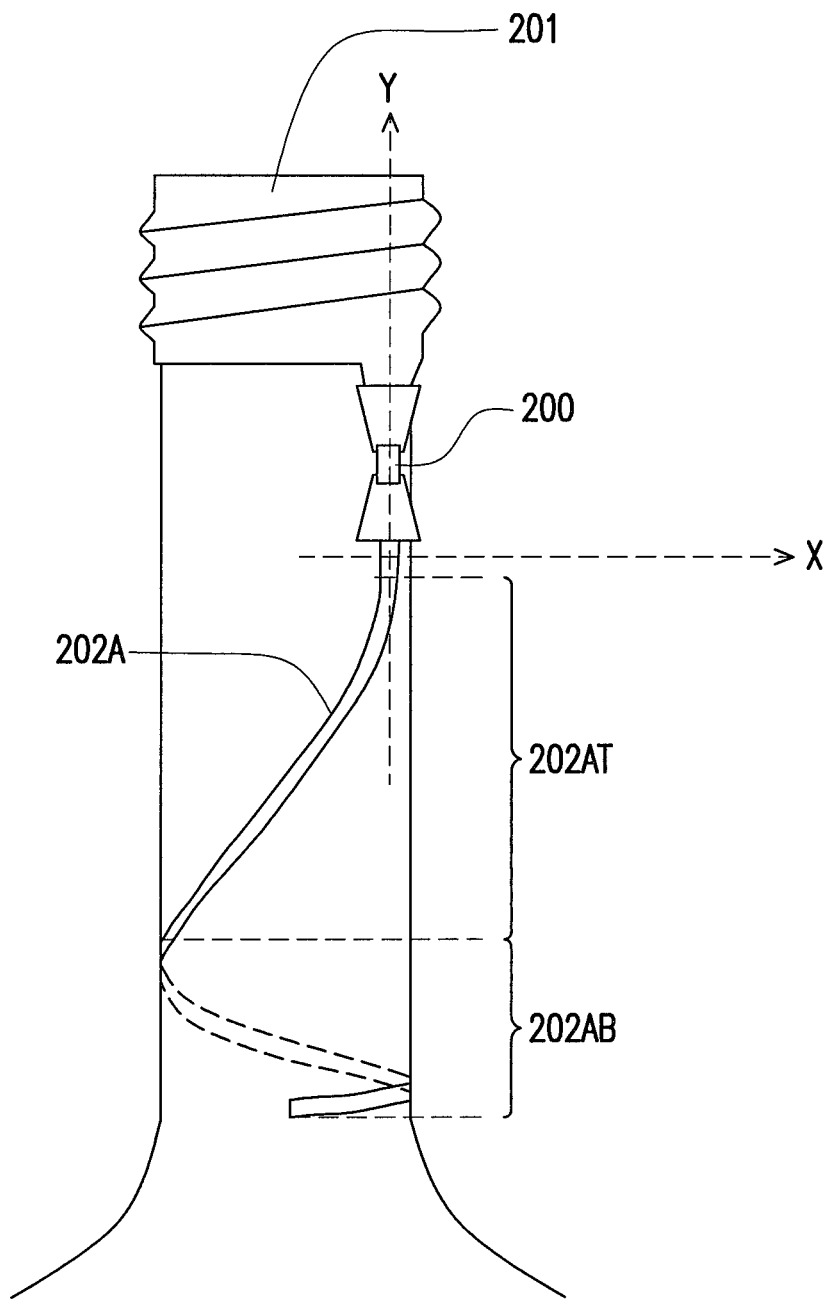
FIG. 7 is a schematic diagram illustrating an RFID sealing device for a bottle according to a second embodiment.

FIG. 7 is a schematic diagram illustrating a RFID sealing device for a bottle according to a second embodiment of the present disclosure. FIG. 7 shows that the metal strip 202A is in a shape of a helix and is configured for winding around the bottleneck with a decreased slope top-down. That is to say, the metal strip 202A has a higher slope on top portion 202AT, and has a lower slope on bottom portion 202AB.

The second embodiment for a decreasing slope to the metal strip may be realized by a metal cap 201 which has a 1.5 cm radius and 2.3 cm height mounted on a bottle 299. A metal strip 202 is 0.1 cm wide and 9.1 cm long, the tilt angle θ between the metal strip 202 with reference to the horizontal line is decreasing. The center frequency for the operation frequency is, for example, 905 MHz. An RFIC 200 is sandwiched, and electrically coupled to, in between the metal cap 201 and the metal strip 202. The effective communication distance is, for example, within three meters according to the second exemplary embodiment.

The curve function for the decreasing slope to the metal strip 202, in the second exemplary embodiment, is exemplified as $$y = -1.12 \times \log \frac{-2x}{3}.$$

The top end of the metal strip 202 is the origin in the Cartesian coordinate system.

Figure 8:
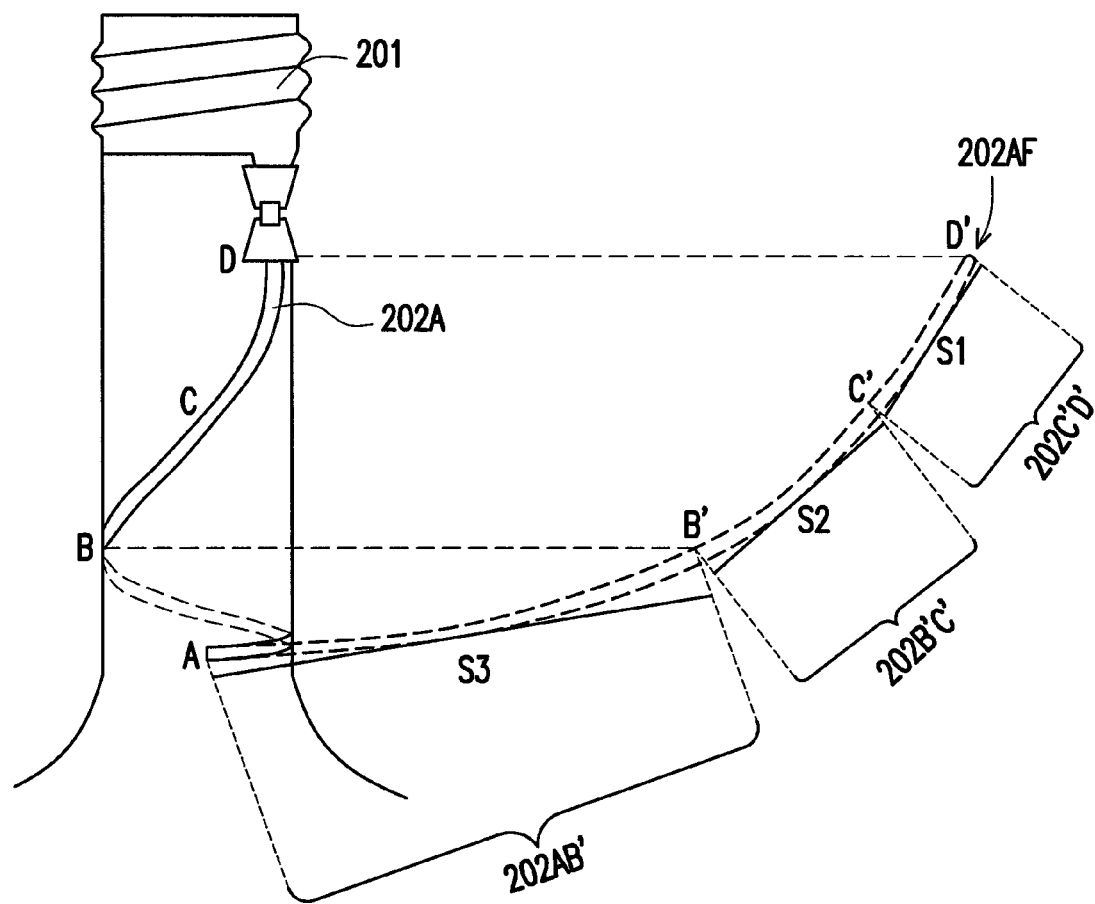
FIG. 8 shows an unfolded and flattened metal strip of FIG. 7.

FIG. 8 shows an unfolded and flattened metal strip of FIG. 7. FIG. 8 shows an unfolded and flattened metal strip of the metal strip 202A, see the curved dashed strip, which is a flattened strip 202AF. The turning point B,C, and D of the metal strip 202A are corresponding to the point B', C', and D' respectively of the flattened strip 202AF. The flattened strip 202AF includes three parts. The first, second and third parts of the flattened strip 202AF are corresponding to the flattened strip 202C'D', 202B'C', and 202AB' respectively. The slope S1, S2, and S3 corresponding to the flattened strip 202C'D', 202B'C' and 202AB' respectively can be seen gradually decreased top-down.

Figure 9:
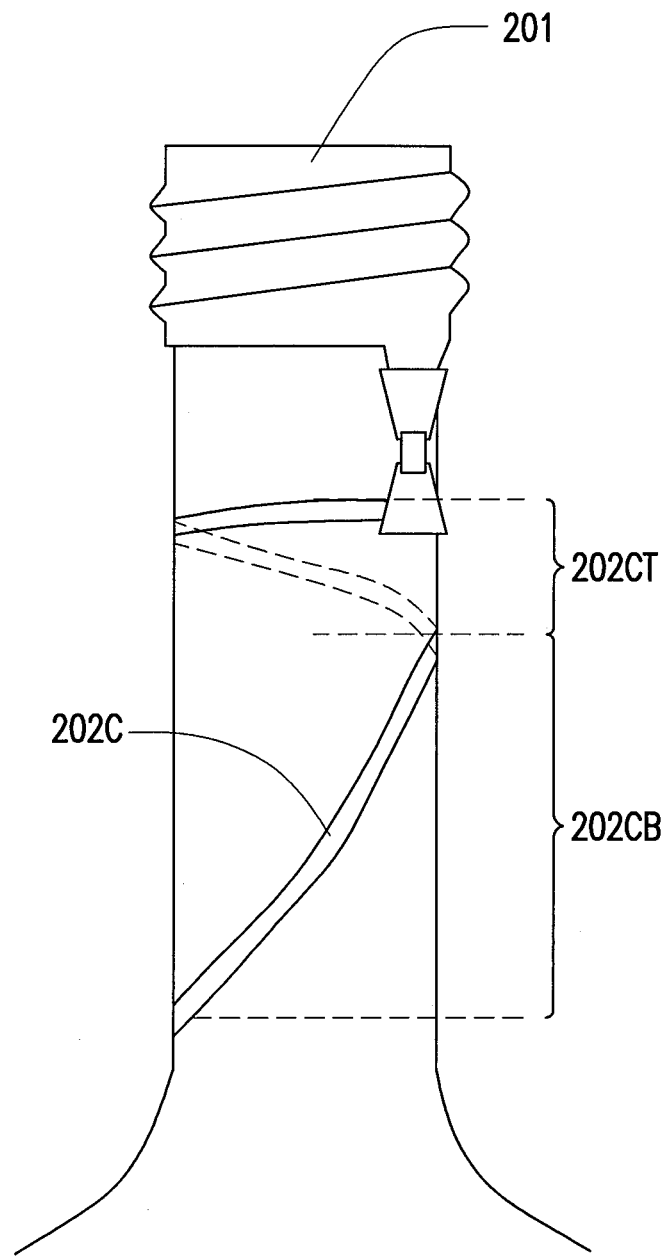
FIG. 9 is a schematic diagram illustrating an RFID sealing device for a bottle according to a third embodiment.

FIG. 9 is a schematic diagram illustrating a RFID sealing device for a bottle according a third embodiment of the present disclosure. FIG. 9 shows that the metal strip 202C is in a shape of a helix and is configured for winding around the bottleneck with an increased slope top-down. That is to say, the metal strip 202C has a lower slope on top portion 202CT, and has a higher slope on bottom portion 202CB.

The third embodiment for an increasing slope to the metal strip may be realized by a metal cap 201 which has a 1.5 cm radius and 2.3 cm height mounted on a bottle 299. A metal strip 202 is 0.1 cm wide and 8.8 cm long, the tilt angle θ between the metal strip 202 with reference to the horizontal line is increasing. The center frequency for the operation frequency is, for example, 900 MHz. An RFIC 200 is sandwiched, and electrically coupled to, in between the metal cap 201 and the metal strip 202. The effective communication distance is within, for example, three meters according to the third exemplary embodiment. The curve function for the increasing slope to the metal strip, in the third exemplary embodiment, is exemplified as $y=-1.45^{0.1x}$. The top end of the metal strip is the origin in the Cartesian coordinate system.

Figure 10:
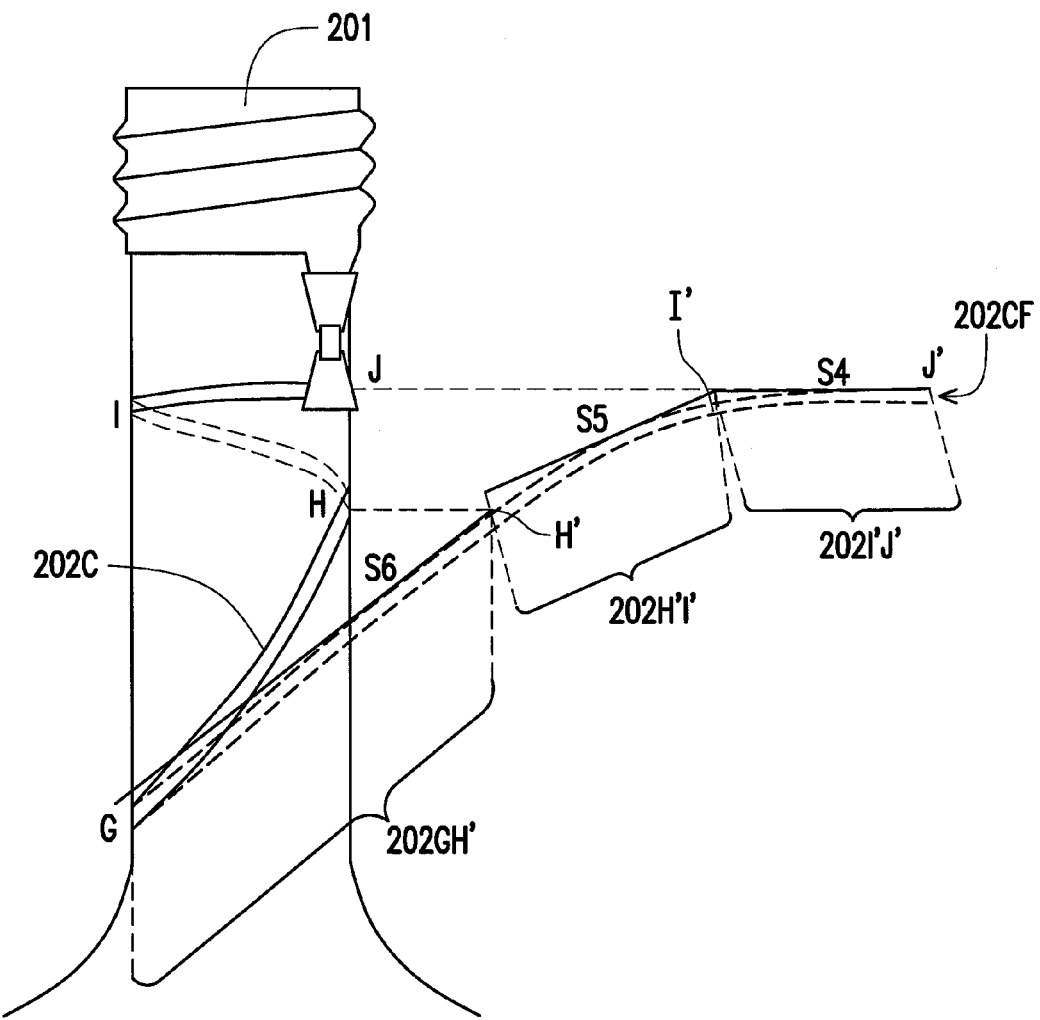
FIG. 10 shows an unfolded and flattened metal strip of FIG. 9.

FIG. 10 is an unfolded and flattened metal strip of FIG. 9. FIG. 10 shows an unfolded and flattened metal strip of the metal strip 202C, see the curved dashed strip, which is a flattened strip 202CF. The turning point H, I and J of the metal strip 202C are corresponding to the point H', I' and J' respectively of the flattened strip 202CF. The flattened strip 202CF includes three parts. The first, second and third parts of the flattened strip 202CF are corresponding to the flattened strip 202I'J', 202H'I', and 202GH' respectively. The slope S4, S5, and S6 corresponding to the flattened strip 202I'J', 202H'I' and 202GH' respectively can be seen gradually increased top-down.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A bottle sealing device, comprising:
   a radio frequency identification (RFID) strap mounted on a bottle, the strap having a top metal, a bottom metal, and a chip coupled between the top metal and the bottom metal, the RFID strap providing a radio frequency source and the top metal and bottom metal being physically isolated and electrically isolated with the chip between the top and bottom metals;
   a metal cap, configured on a top of a bottleneck of the bottle to seal the bottleneck and electrically coupled with the top metal, wherein the metal cap serves as a ground; and a metal strip having a first end and a second end, wherein the first end is electrically coupled to the bottom metal and the second end is an open-ended stub.

2. The bottle sealing device of claim 1, wherein said metal strip is configured to be affixed to a surface of the bottleneck.

3. The bottle sealing device of claim 2, further comprising: a metal tab coupled with the metal cap, the metal tab being configured to be extended downward from a bottom edge of the metal cap.

4. The bottle sealing device of claim 3, further comprising: a top metal piece configured for coupling the top metal with the metal tab.

5. The bottle sealing device of claim 4, further comprising: a bottom metal piece configured for coupling the bottom metal with the first end of the metal strip.

6. The bottle sealing device of claim 1, wherein the metal strip is substantially helical and substantially winds around the bottleneck.

7. The bottle sealing device of claim 6, wherein the metal strip has a substantially-constant, increasing, or decreasing slope as the metal strip winds down the bottleneck.

8. The bottle sealing device of claim 1, wherein a bottom of the metal strip is placed above a liquid level of a liquid contained in the bottle.

9. The bottle sealing device of claim 6, wherein the metal strip has a length of 8.8 to 9.1 cm, and an operating frequency of 900 to 910 MHz.

10. A bottle sealing device, comprising:
a radio frequency identification (RFID) strap mounted on a bottle, the strap having a top metal, a bottom metal, and a chip coupled between the top metal and the bottom metal, the RFID strap providing a radio frequency source and the top metal and bottom metal being physically isolated and electrically isolated with the chip between the top and bottom metals;
a metal cap, covering an opening on a top of a bottleneck of the bottle to seal the bottleneck and electrically coupled with the top metal, wherein the metal cap serves as a ground and provides a ground potential to the RFID strap, and the ground potential of the RFID strap is only provided by the metal cap without additional grounded element; and
a metal strip having a first end and a second end, wherein the first end is electrically coupled to the bottom metal and the second end is an open-ended stub.

11. A bottle sealing device, comprising:
a radio frequency identification (RFID) strap mounted on a bottle, the strap having a top metal, a bottom metal, and a chip coupled between the top metal and the bottom metal, the RFID strap providing a radio frequency source and the top metal and bottom metal being electrically isolated with the chip between the top and bottom metals;
a metal cap, configured on a top of a bottleneck of the bottle to seal the bottleneck and electrically coupled with the top metal, wherein the metal cap serves as a ground; and
a metal strip having a first end and a second end, wherein the first end is electrically coupled to the bottom metal and the second end is an open-ended stub.

* * * * *